(12) United States Patent
Kumar et al.

(10) Patent No.: US 10,031,697 B2
(45) Date of Patent: Jul. 24, 2018

(54) RANDOM-ACCESS DISJOINT CONCURRENT SPARSE WRITES TO HETEROGENEOUS BUFFERS

(71) Applicant: QUALCOMM Incorporated, San Diego, CA (US)

(72) Inventors: Tushar Kumar, San Francisco, CA (US); Aravind Natarajan, Sunnyvale, CA (US); Dario Suarez Gracia, Teruel (ES)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 15/000,667

(22) Filed: Jan. 19, 2016

(65) Prior Publication Data

US 2017/0206035 A1 Jul. 20, 2017

(51) Int. Cl.
*G06F 9/54* (2006.01)
*G06F 3/06* (2006.01)
(Continued)

(52) U.S. Cl.
CPC ............ *G06F 3/0656* (2013.01); *G06F 3/061* (2013.01); *G06F 3/0673* (2013.01); *G06F 9/467* (2013.01);
(Continued)

(58) Field of Classification Search
CPC ....... G06F 3/0656; G06F 9/3834; G06F 9/544
See application file for complete search history.

(56) References Cited

U.S. PATENT DOCUMENTS 7,117,330 B1* 10/2006 Alverson .................. G06F 9/52
710/260
7,406,464 B2 7/2008 Kasten et al.
(Continued)

OTHER PUBLICATIONS

Ceze et al "CoreDet: A Compiler and Runtime System for Deterministic Multithreaded Execution" ACM published Mar. 2010 marked as "A022 Ceze U.S. Appl. No. 61448010 SPEC1", incorporated to Ceze 2012/0226868 at 1:0001 as part 1 of the specification of provisional U.S. Appl. No. 61/448,010, filed Mar. 1, 2011.*
Ceze et al "RCDC: A Relaxed Consistency Deterministic Computer" ACM published Mar. 2011 marked as "A022 Ceze U.S. Appl. No. 61448010 SPEC2", incorporated to Ceze 2012/0226868 at 1:0001 as part 2 of the specification of provisional U.S. Appl. No. 61/448,010, filed Mar. 1, 2011.*
(Continued)

*Primary Examiner* — Edward J Dudek, Jr.
*Assistant Examiner* — Andrew Russell
(74) *Attorney, Agent, or Firm* — The Marbury Law Group

(57) ABSTRACT

Methods, devices, and non-transitory processor-readable storage media for a computing device to merge concurrent writes from a plurality of processing units to a buffer associated with an application. An embodiment method executed by a processor may include identifying a plurality of concurrent requests to access the buffer that are sparse, disjoint, and write-only, configuring a write-set for each of the plurality of processing units, executing the plurality of concurrent requests to access the buffer using the write-sets, determining whether each of the plurality of concurrent requests to access the buffer is complete, obtaining a buffer index and data via the write-set of each of the plurality of processing units, and writing to the buffer using the received buffer index and data via the write-set of each of the plurality of processing units in response to determining that each of the plurality of concurrent requests to access the buffer is complete.

30 Claims, 7 Drawing Sheets

(51) Int. Cl.
G06F 12/1072 (2016.01)
G06F 9/46 (2006.01)
G06F 9/38 (2018.01)

(52) U.S. Cl.
CPC ........ *G06F 12/1072* (2013.01); *G06F 9/3834* (2013.01); *G06F 9/544* (2013.01); *G06F 2212/65* (2013.01)

(56) References Cited

U.S. PATENT DOCUMENTS

| | | | |
|---|---|---|---|
| 8,423,717 B2 | 4/2013 | Gray et al. | |
| 2009/0235262 A1* | 9/2009 | Ceze | G06F 9/52 718/102 |
| 2011/0179230 A1* | 7/2011 | Chou | G06F 9/467 711/147 |
| 2012/0079164 A1 | 3/2012 | Hakewill | |
| 2012/0226868 A1* | 9/2012 | Ceze | G06F 9/3851 711/125 |
| 2013/0014118 A1* | 1/2013 | Jones | G06F 9/52 718/104 |
| 2013/0254488 A1 | 9/2013 | Kaxiras et al. | |
| 2015/0378632 A1 | 12/2015 | Gschwind et al. | |
| 2016/0041855 A1* | 2/2016 | Schule | G06F 9/544 719/312 |

OTHER PUBLICATIONS

Saha B., et al., "Programming Model for a Heterogeneous x86 Platform", PLDI '09, Proceedings of the 30th ACM SIGPLAN Conference on Programming Language Design and Implementation, Jun. 15-20, 2009, pp. 431-440.

Xun C.Q., et al., "Efficient Fine-Grained Shared Buffer Management for Multiple OpenCL Devices," Journal of Zhejiang University—Science C (Computers & Electronics), 2013, vol. 14 (11). pp. 859-872.

"International Search Report and Written Opinion—PCT/US2016/066319—ISA/EPO—Mar. 9, 2017".

Narula N., et al., "Phase Reconciliation for Contended In-Memory Transactions," Proceedings of the 11th USENIX Symposium on Operating Systems Design and Implementation Oct. 6, 2014 (Oct. 6, 2014), pp. 511-524, XP055349697 ISBN: 978-1-931971-16-4 Retrieved from the Internet: URL:https://www.usenix.org/system/files/conference/osdi14/osdi14-paper-narula.pdf [retrieved on Feb. 27, 2017].

Tu S., et al., "Speedy Transactions in Multicore in-memory Databases," Proceedings of the Twenty-Fourth ACM Symposium on Operating Systems Principles, SOSP '13, Nov. 3, 2013 (Nov. 3, 2013)-Nov. 6, 2013 (Nov. 6, 2013), pp. 18-32, XP055345577, New York, New York, USA DOI: 10.1145/2517349.2522713 ISBN: 978-1-4503-2388-8.

* cited by examiner

Pseudocode

| | |
|---|---|
| //create a buffer with 100000 entries<br>buffer<float> b(100000); | 402 |
| //launch tasks on different processing units<br>//buffers a,c,d,e get transferred to processing units at launch<br>//buffer b does not get transferred as it is declared SDWO<br>t1 = launch_task(cpu_function, a, sdwo(b), ...);<br>t2 = launch_task(gpu_kernel, c, sdwo(b), ...);<br>t3 = launch_task(dsp_kernel, d, sdwo(b), ...);<br>t4 = launch_task(custom_hw_acc1, e, sdwo(b), ...); | 404 |
| //wait for all concurrent tasks to complete SDWO access to buffer b<br>wait_for(t1);<br>wait_for(t2);<br>wait_for(t3);<br>wait_for(t4); | 406 |

Kernel Pseudocode for SDWO

```
void f(global float* c, global float* b_sdwo)
{
    ...
    sdwo_write(b_sdwo, i, value);
}
```

Kernel Pseudocode with SDWO specialized HW

```
void f(global float* c, global float* b)
{
    ...
    b[i] = value;
}
```

FIG. 5B

RANDOM-ACCESS DISJOINT CONCURRENT SPARSE WRITES TO HETEROGENEOUS BUFFERS

BACKGROUND

Computing devices often utilize runtime systems to create abstractions of data that are accessible by various processing units or functionalities, such as central processing units (CPUs), digital signal processors (DSPs), graphical processing units (GPUs), camera pipelines, etc. Some runtime systems can identify and manage access to data for an application that is stored in various memory units of a computing device. In particular, some runtime systems may manage the application data and provide an abstract representation, such as a "buffer" to abstract over array data. Buffer data may reside on various types of memory units accessible by various processing units of a computing device. Buffer data may be accessed via a programmatic buffer handle that may be used by application code executing on the various processing units. In response to buffer access requests (e.g., using programmatic buffer handle), runtime systems can move buffer data to memory units associated with requesting processing units.

Due to the different capabilities and structures of the various processing units of a computing device, such runtime systems often make the data of buffers available via different manners for different processing units. In particular, copies of buffer data may be individually stored and formatted as "backing stores" on suitable memory units accessible by particular processing units. For example, a backing store may be an allocated block of main memory for a CPU, a specialized driver-managed data store generated using OpenCL drivers for a GPU, an allocated block on a specialized region of main memory (such as ION memory on Advanced RISC Machines (ARM) architectures) for a DSP or a camera pipeline, and/or internal registers and local memory banks for a custom accelerator.

Some runtime systems internally allocate and synchronize various backing stores across processing units. Additionally, for some processing units, such runtime systems may provide abstract programmatic mechanisms by which application code executing on a processing unit may be able to read and write the buffer data. In such cases, the application code may access the buffer data contents (e.g., via a runtime system) without knowledge of which backing stores currently hold the buffer data. Some runtime systems may hide the layout of buffer data within a backing store from application code. Such abstract interfaces for data access typically allow runtime systems to perform various data movement, data storage, and/or synchronization optimizations.

SUMMARY

Various embodiments provide methods, devices, and non-transitory process-readable storage media for a multi-processor computing device to merge concurrent writes from a plurality of processing units to a buffer associated with an application. An embodiment method performed by the multi-processor computing device may include identifying a plurality of concurrent requests to access the buffer that are sparse, disjoint, and write-only (SDWO), configuring a write-set for each of a plurality of processing units, executing the plurality of concurrent requests to access the buffer using the write-sets, determining whether each of the plurality of concurrent requests to access the buffer is complete, obtaining a buffer index and data via the write-set of each of the plurality of processing units, and writing to the buffer using the obtained buffer index and data via the write-set of each of the plurality of processing units in response to determining that each of the plurality of concurrent requests to access the buffer is complete. In some embodiments, identifying the plurality of concurrent requests to access the buffer that are sparse, disjoint, and write-only (SDWO) may include identifying an SDWO application programming interface (API) call of a task executing on each of the plurality of processing units.

Some embodiments may further include receiving an index for a buffer element from one of the plurality of processing units, and performing a virtual address translation to identify a physical address for the buffer element corresponding to the received index. Such embodiments may further include transmitting the physical address to the one of the plurality of processing units for direct writing of a buffer element value to the buffer in response to performing the virtual address translation.

In some embodiments, determining whether each of the plurality of concurrent requests to access the buffer is complete may include waiting until all of the plurality of processing units have completed performing respective tasks for writing to associated write-sets. In some embodiments, determining whether each of the plurality of concurrent requests to access the buffer is complete may include identifying a marker within code of the application indicating completion of requested buffer accesses by the plurality of processing units. Some embodiments may further include determining whether the plurality of processing units are configured to directly write to the buffer, and serially transmitting a signal to each of the plurality of processing units in response to determining that the plurality of processing units are configured to directly write to the buffer, in which the signal indicates when each of the plurality of processing units can directly write to the buffer.

Some embodiments may further include identifying another plurality of concurrent requests to access the buffer that are not sparse, disjoint, and write-only, and serially transferring the buffer to each processing unit associated with the another plurality of concurrent requests such that the another plurality of concurrent requests are executed serially. Some embodiments may further include identifying a coordinator processor as having a backing store with valid data for the buffer, and transmitting data of the write-sets to the coordinator processor for writing to the backing store in response to determining that each of the plurality of concurrent requests to access the buffer is complete. In some embodiments, writing to the buffer using the obtained buffer index and data via the write-set of each of the plurality of processing units in response to determining that each of the plurality of concurrent requests to access the buffer is complete may include writing to the backing store associated with the coordinator processor.

In some embodiments, each of the plurality of concurrent requests to access the buffer may corresponds to an access of a separate data structure that uses the buffer as a memory pool, in which the data structure may be one of a linked list or a tree. In some embodiments, the application may be a step simulation program. In some embodiments, the processor may be executing a runtime system. In some embodiments, identifying the plurality of concurrent requests to access the buffer that are sparse, disjoint, and write-only (SDWO) may include determining that the plurality of concurrent requests are requests to write the same value to the same buffer index.

Further embodiments include a computing device configured with processor-executable instructions for performing operations of the methods described above. Further embodiments include a computing device having means for performing functions of the methods described above. Further embodiments include a non-transitory processor-readable medium on which is stored processor-executable instructions configured to cause a computing device to perform operations of the methods described above.

BRIEF DESCRIPTION OF THE DRAWINGS

The accompanying drawings, which are incorporated herein and constitute part of this specification, illustrate various embodiments, and together with the general description given above and the detailed description given below, serve to explain the features of the claims.

FIG. 4 is a listing of pseudocode for a runtime functionality that enables concurrent buffer accesses that are sparse, disjoint, and write-only according to some embodiments.

FIGS. 5A-5B are listings of pseudocode that may be performed by processing units of a multi-processor computing device according to some embodiments.

DETAILED DESCRIPTION

Figure 1:
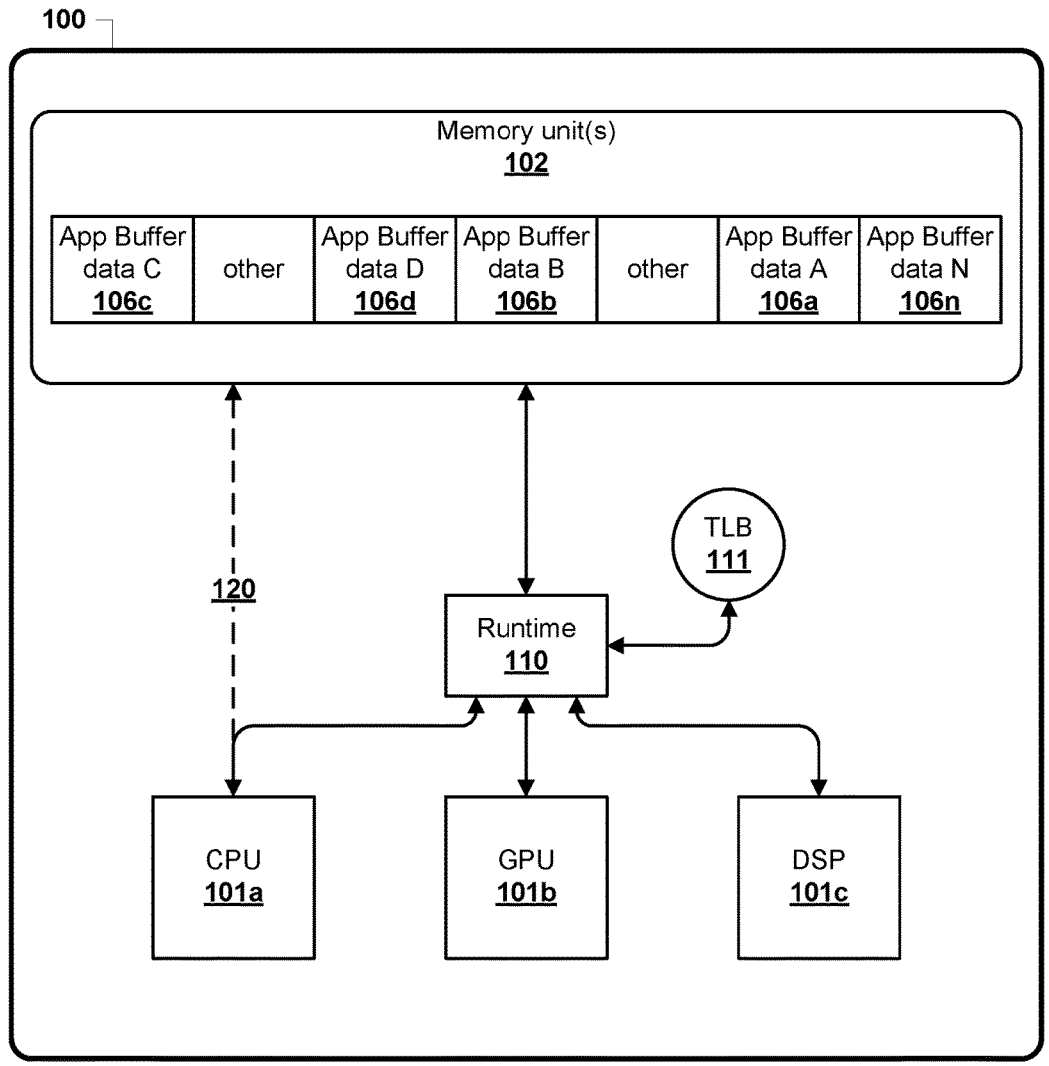
FIG. 1 is a component block diagram of a multi-processor computing device configured to support sparse, disjoint, write-only operations according to various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the embodiments or the claims.

This disclosure includes illustrative descriptions of various implementations or embodiments. However, any implementation described herein should not necessarily be construed as preferred or advantageous over other implementations.

The term "computing device" is used herein to refer to an electronic device equipped with at least a processor. Examples of computing devices may include mobile devices (e.g., cellular telephones, wearable devices, smartphones, web-pads, tablet computers, Internet enabled cellular telephones, Wi-Fi® enabled electronic devices, personal data assistants (PDA's), laptop computers, etc.), personal computers, and server computing devices.

The term "multi-processor computing device" is used herein to refer to a computing device configured to execute various tasks (e.g., routines, instruction sets, etc.) with two or more processing units. For example, a multi-processor computing device may be a heterogeneous computing device (e.g., a system-on-chip (SoC)) with different processing units each configured to perform specialized and/or general-purpose workloads. Such processing units may include various processor devices, a core, a plurality of cores, etc. For example, processing units of a multi-processor computing device may include an application processor(s) (e.g., a central processing unit (CPU)) and one or more specialized processing devices, such as a graphics processing unit (GPU), a digital signal processor (DSP), and a modem processor.

In general, processing units of a multi-processor computing device may execute various software, routines, kernels, threads, instructions, and/or code associated with an application (referred to herein simply as "tasks"). Some tasks executing on various processing units of a multi-processor computing device may be configured to access a common buffer. Conventional techniques for enabling and managing buffer accesses by various tasks often result in suboptimal performance. For example, in some cases, tasks may be configured to manage coherent access to the buffer data, such as via the use of critical sections, atomic variables, and other application-managed access techniques. However, such application-managed access techniques can fail when processing units that rely on different backing stores of buffer data execute concurrent buffer accesses. For example, a CPU task can read and write to a buffer by accessing a backing store in main memory, while a concurrently-executing GPU task can access an OpenCL-managed backing store, often in GPU local memory. The concurrent CPU and GPU tasks may not be aware of updates to the buffer performed other tasks, causing the buffer data to become inconsistent.

In many cases, runtime systems managing buffers on behalf of applications may be forced to serialize the execution of a plurality of processing units that would concurrently write to a buffer, thereby slowing application execution. In addition to the performance penalty incurred when runtime systems serialize execution of tasks writing buffer data, there may be additional costs incurred due to necessary synchronization of data between the backing stores in between the execution of the serialized tasks. Such synchronization by the transfer of data from a first backing store (accessible by some of the processing units) to a second backing store (accessible by some other processing units) may be required so that updates to the buffer by the earlier executing tasks become visible to the later executing tasks.

In some cases, a first backing store and a second backing store may be tied together such that a runtime system need only change some memory configuration and perform driver flushes to ensure the second backing store has up-to-date data (i.e., a low cost synchronization). However, in many common situations, the entire contents of the buffer data must be copied from the first backing store to the second backing store (referred to as a "full-buffer copy"), even if only a small portion of the buffer data has been updated in the first backing store compared to the data already present in the second backing store. This type of synchronization can impact device performance by requiring significant processing time and consuming battery power.

Not all backing stores of a computing device may be configured for coherency, and thus flushing may be required. For example, some processing units may access a backing store in shared virtual memory (SVM) allowing concurrent writes in a consistent manner. Other processing units may only support partial SVM in which accesses to a backing store originating from different processing units are inconsistent due to a lack of cache-coherence mechanisms. In such cases, explicit driver-managed flushes may be required to synchronize with the backing store.

In other cases, multiple tasks executing on various processing units may concurrently write to the same buffer without creating inconsistency, such as writes to distinct elements of the buffer. However, the involvement of multiple backing stores and/or the lack of coherency mechanisms on backing stores may result in performance penalties (e.g., task serialization, full-buffer copies, etc.). Even if concurrent tasks accessed an SVM backing store, there may be the possibility of "false sharing" in which different tasks write to different buffer elements co-located on the same cache line, causing cache thrashing and performance degradation.

Techniques are needed that enable concurrent execution of tasks despite multiple backing stores and avoid full-buffer copies between backing stores that would otherwise need full-buffer copy synchronization.

The various embodiments include techniques for improving operations in a multi-processor computing device during concurrent buffer accesses that are "sparse, disjoint, and write-only" (SDWO). As referred to herein, SDWO buffer accesses may correspond to special-case accesses by one or more processing units (or tasks executing on the one or more processing units) of a multi-processor computing device to a buffer assigned to an executing application (e.g., a program, etc.). Concurrent SDWO buffer accesses may be random (e.g., indices accessed are determined only at runtime by each processing unit), sparse (i.e., only a small fraction of the buffer is likely to be accessed), disjoint (i.e., various processing units access distinct buffer indices), and write-only (i.e., none of the processing units participating in concurrent SDWO buffer accesses may read any of the buffer data).

Various embodiments include methods, as well as multi-processor computing devices executing such methods and non-transitory process-readable storage media storing instructions of such methods, to merge concurrent SDWO writes to an application's buffer. In general, a multi-processor computing device may be configured to identify concurrent requests by various processing units to perform SDWO accesses of a buffer for an application (e.g., a program, etc.). For example, the multi-processor computing device, via a runtime functionality, may identify the invocation in task code of special application programming interface (API) calls associated with SDWO buffer accesses (or access requests). When concurrent SDWO buffer access requests occur, the multi-processor computing device may set up each processing unit with a per-device write-set instead of copying the buffer data across backing stores used by each of the processing units. For example, the multi-processor computing device may configure a write-set comprised of a set of buffer index, value pairs for each processing unit. The individual processing units may use the respective write-sets to indicate buffer locations (e.g., index(es)) corresponding to data to be written to the buffer. When the concurrent SDWO buffer accesses are complete and all write-set information is received from the processing units, the multi-processor computing device may perform writes to the buffer as defined by the various per-device write-sets. For example, the write-sets may be used to update a current backing store maintained by an individual processing unit (e.g., CPU) that the multi-processor computing device uses to update the buffer. The various embodiments enable the multi-processor computing device to execute power-efficient and time-efficient writes to a buffer that do not require processing units to have the same coherency abilities. This capability avoids the serialization and/or costly buffer copying/allocations.

In various embodiments, SDWO buffer accesses may be identified by application programmers based on the semantics of applications. In particular, an application programmer may explicitly declare a buffer access as an SDWO access within code of a task. For example, a CPU task and a GPU task may be structured (or coded) to update distinct elements of a buffer, not read any part of the buffer, and may likely write only to a small fraction of the elements of the buffer. Based on these semantics or characteristics of the tasks of the application, an application programmer may be able to determine that the CPU and GPU tasks may execute SDWO buffer accesses. The application programmer may designate accesses by the CPU task and GPU task as SDWO for that buffer, such as by programming the respective tasks to utilize a suitable SDWO API call. When the tasks are executed and invoke the SDWO API call, the multi-processor computing device (e.g., via a runtime functionality) may perform embodiment SDWO optimizations, allowing the tasks for the CPU and the GPU to execute concurrently while avoiding full-buffer copies.

As another example, separate buffer entries may act as "data payloads" for nodes of linked-list data-structures used by an application. A first and a second linked-list may have associated buffer entries interspersed over the buffer for the application. However, accessing the nodes of the first linked list would access buffer entries distinct from the buffer entries associated with nodes of the second linked list. A kernel configured to run on a DSP may "walk" (or traverse) the first linked list and write the corresponding buffer entries for the corresponding node data, whereas a kernel configured to run on a GPU may walk the second linked list and write the corresponding buffer entries. As each kernel addresses a different data element/data object of the buffer, the corresponding write requests would only address distinct, though possibly interspersed elements of the buffer. As there are no producer-consumer relationships on buffer entries across processing units, disjointness of concurrent write requests is guaranteed, and therefore the application programmer may declare such write requests SDWO within the kernels' code. As another example, a DSP kernel and a GPU kernel working on two sibling sub-trees of a tree data-structure may be declared SDWO over the writes to a buffer whose entries act as the data payload for the tree nodes.

In various embodiments, the multi-processor computing device may be configured to identify tasks or processing units that will make concurrent buffer accesses that are SDWO. For example, the multi-processor computing device may evaluate application code or instruction sets to detect when kernels for two processing units (e.g., CPU, GPU, etc.) are configured to submit requests to write data to distinct buffer indexes. In various embodiments, compiler analysis of kernel code may indicate that buffer indices written to by a first kernel are distinct from the buffer indices written to by a second kernel. In some embodiments, the multi-processor computing device, via a runtime functionality, may identify application programming interface (API) calls within code of tasks to be executed via one or more processing units (e.g., tasks for a GPU, CPU, and DSP that correspond to a particular physics engine program). The runtime functionality may be informed that the tasks make SDWO buffer access requests before the corresponding processing units (e.g., GPU, CPU and DSP) launch and execute the tasks. For example, SDWO buffer accesses may be declared within code beforehand. An example of such an API that may be called is an "sdwo(b)" command, wherein 'b' is a buffer handle passed as an argument to a task invoking the API command.

In various embodiments, in response to detecting concurrent requests by a plurality of processing units (and respective tasks) to perform SDWO buffer accesses of the buffer, the multi-processor computing device may set-up (or configure) each of the processing units with per-device write-sets. For example, instead of allocating backing stores and transferring data to the various processing units, the multi-processor computing device may simply instruct the processing units to set up write-sets for a given buffer identified as having SDWO access. With the write-sets, the code executing on the individual processing units (e.g., kernel code) may provide indices of the buffer that should be updated with new data, such as via an API call. For example, a kernel executing on a DSP may execute an API call (sdwo_write( . . . )) that includes the index of the buffer and a data value of the type stored by the buffer (e.g., with a "float" buffer, the processing unit may invoke "sdwo_write (index, 3.0)" to write the floating-point value "3.0" at the specified buffer index, etc.).

In general, there may be various device-specific mechanisms for creating write-sets within the local memory of each processing unit (or processing device) of the multi-processor computing device. In some embodiments, a write-set of a processing unit may be implemented as an array of index-data pairs, with a new index-data pair appended by the processing unit in response to each sdwo_write( ) call on that processing unit. In some embodiments, hash-maps may be used to record the index-data pairs of write-sets. Use of the write-sets enables new buffer data to be communicated between processing units without time and power-consuming data transfers of the entire contents of the buffer back and forth between storage units (e.g., device caches, etc.). In some embodiments, when all the various processing units of the multi-processor computing device utilize full or partial SVM support, write-sets may be enabled via pointers provided to the processing units.

In some embodiments, the multi-processor computing device may transfer write-sets from various processing units to a coordinator processor. Such a coordinator processor may be identified or designated based on the processor being associated with a valid backing store of the buffer. For example, a CPU having a memory backing store with the latest data of the buffer may be identified as the coordinator processor and thus may receive the write-sets for inserting data from the processing units into the backing store. In some embodiments, the coordinator processor may be any processing unit within the multi-processor computing device that has a valid backing store of the buffer. In some embodiments, the multi-processor computing device may perform operations to rank or otherwise sort in order of efficiency each processing unit that may function as a coordinator processor in order to use the fastest and/or most efficient processing unit and backing store.

The following is an illustration of an implementation of SDWO buffer accesses and a coordinator processor. After concurrently executing processing units have updated respective write-sets for SDWO buffer accesses, the various write-sets may be sent to a designated coordinator processor (e.g., a CPU) that has access to a backing store for the buffer. Such a coordinator processor may update the backing store using the received write-sets. Since the writes by the coordinator processor are sparse, the total size of all write-sets may be small compared to the size of the buffer. Therefore, the backing store may be updated with the writes in a duration of time much shorter than the time required to transfer the entire contents of the buffer, as would have been necessary without SDWO.

In various embodiments, the processing units may transfer write-sets (e.g., to the coordinator processor) either when a processing unit has completed (e.g., completed a task), or intermittently during the execution of a task on the processing unit. In some embodiments, the coordinator processor may determine when to update a backing store for the buffer based on determining that all processing units associated with concurrent SDWO buffer accesses have completed operations and, thus, have transferred write-set data. In some embodiments, a programmer may simply indicate a completion point after which any updates of kernels/processing units should occur.

When concurrent SDWO buffer accesses are complete (e.g., all write-sets have been received from processing units), the multi-processor computing device may update a backing store that includes valid buffer data. For example, the multi-processor computing device may overwrite data in an up-to-date copy of the buffer backing store accessible by a CPU.

Even using write-sets can be costly when individual entries in a buffer are very large. For example, transfer of a large data value to a coordinator processor via a write-set and then the writing of the data value to a backing store by the coordinator processor may entail two transfers of the large data value over the memory system. To address this, in some embodiments, the multi-processor computing device may be configured to identify processing units that can perform write-backs directly to memory using buffer indices. In other words, some processing units may be configured to directly access a backing store being updated by the coordinator processor in order to avoid an extra data value transfer. Such a technique may not require coherent access to the backing store. For example, the backing store of a coordinator processor may be in GPU local memory, allowing a write-set created by a GPU kernel to be directly updated to the backing store under the supervision of the coordinator processor.

In some cases, processing units that have direct coherent access to a backing store, such as via SVM, may not need to use write-sets, but other units without coherent access capabilities may use write-sets. In this way, embodiment techniques enable the mixing of the two types of processing units and may reduce the number of write-sets involved. For example, after ensuring the completion of concurrently executing processing units that make SDWO accesses to a buffer, the multi-processor computing device may signal various processing units with SVM functionalities to serialize buffer write-backs, punctuated by appropriate driver flushes. Such embodiments may enable the multi-processor computing device to mix direct write-back of the write-sets by some processing units (e.g. CPU) with write-set updates performed by the coordinator processor for other processing units/devices (e.g., DSP, GPU, accelerators).

For example, the multi-processor computing device may identify that some processing units may be capable of directly accessing memory such that backing stores with the latest buffer data may be directly accessible by these processing units, though perhaps not in a coherent manner. Thus, associated backing stores may not be required to be allocated or synchronized to hold the latest buffer data before these processing units perform SDWO operations. Such processing units may not need to send write-sets to a coordinator processor, but instead may write data associated with SDWO buffer accesses directly after execution of the concurrent SDWO buffer accesses. The coordinator processor may signal these processing units to indicate when each may safely apply write-set data directly to the backing store. The coordinator processor may ensure correctness by serializing the write-set writes by each processing units and/or executing memory barrier instruction to ensure coherence before signaling the next processing unit.

In some embodiments, when processing units can handle physically addressed memory but have no virtual address capabilities, the processing units may send write-set indices to the multi-processor computing device (e.g., the coordinator processor) for virtual address translations. For example, when a DSP is not configured to utilize a translation lookaside buffer (TLB) for virtual address translations, the multi-processor computing device, via a runtime functionality, may perform conversion operations to translate buffer indices from the DSP into physical addresses. Based on such translations, the individual processing units may use the physical addresses to directly write to memory.

In some embodiments, the multi-processor computing device may be configured with dedicated hardware that enables SDWO buffer accesses without special API calls. For example, hardware may be configured to enable runtime recognition of the address ranges of regular accesses to a buffer in kernel code and translate those automatically into a write-set for that buffer. Such embodiment multi-processor computing devices may enable seamless write-set use that is invisible to programmers. With such hardware implementations, individual kernels executing on processing units may simply use regular API calls and/or buffer accesses. Such implementations allow the hardware improvements to identify SDWO buffer accesses and act without additional programmer effort.

In various embodiments, the multi-processor computing device may be configured to support reads of a buffer while maintaining concurrency between various processing units. For example, the multi-processor computing device may provide heterogeneous processing units with a previous version of a buffer (e.g., a time 't' version of a buffer used in a physics simulation) for reading purposes and configure write-sets for writing to the buffer (e.g., to capture simulation-state updates for time 't+1' by concurrently executing processing units). Subsequent SDWO write calls by the processing units may generate the write-sets (e.g., data to be written), which may be applied to a backing store holding the time T version of the buffer data to generate the updated time 't+1' version of the buffer backing store.

In some embodiments, the multi-processor computing device may be configured to enable buffer accesses that are not necessarily disjoint. In other words, the multi-processor computing device may implement "approximation-tolerant" concurrent SDWO buffer accesses. For example, when concurrent updates to a certain buffer index (e.g., b[i]) are deemed valid (e.g., the concurrently written values are all considered "approximately correct", or there is an expectation that each processing unit will attempt to write the same value, etc.), the multi-processor computing device may apply both write-sets to the buffer. In other words, when identifying that a plurality of concurrent requests to access the buffer are SDWO, the multi-processor computing device may determine that the plurality of concurrent requests are requests to write a same value to a same buffer index. In some embodiments, such relaxed circumstances for disjointness may require new API calls, such as "sparse, approximate, write only" (e.g., sawo_write).

Methods according to the various embodiments may be performed by a runtime functionality supported by the multi-processor computing device. For example, a processing unit (e.g., CPU) may be configured to execute or otherwise utilize a service, software, instructions, circuitry, or any combination thereof that identifies concurrent SDWO buffer accesses (e.g., identified SDWO API calls in task code, etc.) and provides write-sets to various processing units to facilitate concurrent SDWO requests.

Various embodiments provide methods for processing units (e.g., GPU, CPU, DSP, etc.) of a multi-processor computing device to concurrently perform sparse, disjoint and write-only operations corresponding to an application's buffer. Specifically addressing SDWO buffer accesses, the methods of various embodiments may be used to configure a multi-processor computing device to synchronize a plurality of sparse and disjoint writes to a buffer, only writing to a single buffer representations (e.g., a backing store, memory, etc.) when all concurrent writing units have provided respective data. This enables operations that typically would be serialized (e.g., executed in sequence) to be performed concurrently. Such embodiment methods may reduce the amount of redundant buffer data that is required to be copied and/or transferred in order for multiple devices to perform such writes. For example, full-buffer-copies may be eliminated as tasks on different processing units may use write-sets to update buffers. As another example, as processing units can be enabled to directly write to a buffer in embodiments that utilize signaling and/or virtual address translations from a coordinator processor, double copying of updated buffer elements may also be eliminated, such as when a buffer element is transferred from the processing unit to the coordinator processor to a backing store. These improvements can be especially beneficial when buffers or buffer elements are large.

The various embodiments may also improve power usage of multi-processor computing devices. For example, power may be saved by deactivating cache-coherency protocols (e.g., full SVM) and/or by reducing the amount of bus activity (e.g., minimizing data transfer overheads by avoiding buffer copying, etc.). Various embodiments may further improve the operations of a multi-processor computing device by decreasing the potential thrashing that could otherwise occur due to cache accesses of a plurality of devices.

Applications (or programs) that utilize linked lists may benefit from the various embodiments. In some cases, multiple linked lists may be allocated from a single pool. If the pool is a runtime-managed buffer, the linked list nodes from the multiple linked lists may be dispersed throughout the buffer. If a plurality of tasks concurrently executing via a plurality of processing units process distinct linked lists allocated from the same buffer pool, the accesses from the concurrent tasks will be disjoint. In cases in which the linked lists nodes are allocated outside the buffer but the buffer holds the "payloads" for the nodes, buffer accesses to the payloads may be write-only because reading to traverse the linked list (e.g., reading next pointers of nodes) may be done with the data outside of the buffer. In other cases, if the linked list nodes are allocated from within the buffer, the processing units may be provided (e.g., via a runtime functionality) with a read-only copy of the buffer data, while any writes to the contents of a linked-list node may be recorded in write-sets. After the concurrently executing processing units complete, the write-sets may be applied to a single backing store, which will represent the updated buffer data. While the cost of making read-only copies of the backing stores available to the processing units may not be avoided, the costs of serialization and full buffer copies of the updated buffer contents are avoided.

Applications that utilize tree data-structures may also benefit from the various embodiments. In some cases, tree data-structures may be efficiently stored as elements of an array, or alternatively tree node "payloads" may be pool-allocated within a buffer. For example, a programmer may recognize code configurations of an application that include tasks operating on sibling sub-trees under a root. In such a case, the task accesses may be identified as SDWO, in a manner similar to linked-list embodiments.

Time-step simulations (or applications) may benefit from embodiment techniques. For example, backing stores of processing units executing time-step simulation tasks may each include data for a time-step 't'. Each task executing on the processing units may read such data for time-step 't', possibly requiring one buffer copy in the backing stores for each processing unit. However, write operations for the various tasks may only be for time-step 't+1'. Write-sets for the various processing units may be updated at the end of the concurrent tasks to one chosen backing store, avoiding a second buffer copy from each updated backing store. Hence, concurrent task execution may be supported using the SDWO methodology despite the presence of certain patterns of buffer reads often seen in time-step simulations, and thus a computing device implementing various embodiments may avoid copying the updated backing stores again and again after each serialized task completes updates.

As described, embodiment methods may be particularly beneficial with applications that require multiple, potentially diverse processing units to perform writes to a large buffer, such as step simulations or other programs that supporting large systems (e.g., video game physics engines, linked lists, computer vision applications, etc.). For example, when executing a game physics engine, the multi-processor computing device may employ SDWO buffer accesses as described herein to implement an efficient collision detection algorithm that concurrently updates small portions of large world-state data per compute step, requiring little copying or buffer transfers.

Unlike other typical systems, the embodiment methods may be used to improve concurrent writing to an application buffer used by processing units that may or may not utilize cache coherency technologies. For example, various embodiments may be used to conduct concurrent writes from processing units that may or may not be configured to perform virtual address translations. Typical cache coherency methods do not provide optimizations for the special use case of concurrent sparse, disjoint, write-only accesses to a single application buffer. For example, typical methods may not decrease system traffic when a processing unit is required to write multiple times to the same buffer index, but instead may require multiple cache line reads in order to conduct the multiple writes. The embodiment methods do not require "dirty bit" methods or reading entire cache lines in order to write a portion of the cache lines, as loads or reads may be skipped with SDWO buffer accesses specifically addressed herein.

Conventional multi-processor computing devices may require special and/or modified architectures, and/or schemes that require segregation between memory ranges or address spaces. For example, some typical schemes require partitioned storage/memory units for different applications. As another example, some typical schemes utilize particular address ranges of memory that are pre-associated with particular applications. The embodiment methods do not require such associations of architectures or multiple address spaces. Instead, embodiment methods address SDWO buffer accesses that correspond to a single buffer for an individual application (or program). For example, concurrent SDWO buffer accesses may relate to a buffer that is stored at various locations through one or more memory units of a computing device. The embodiment methods address concurrent writes that are disjoint, such as different data elements of one program that are stored within the same address space. Thus, various embodiment methods do not utilize partitioned or restricted memory spaces. Further, various embodiment methods require synchronization that is not required in various range-based partitioning schemes.

The descriptions of various embodiments refer to scenarios in which there are concurrent requests to perform SDWO buffer accesses. However, the various embodiments may also provide performance improvements when only one processing unit requests to perform SDWO buffer accesses with regard to an application's buffer. In other words, even without a plurality of concurrent writes to an application's buffer, the multi-processor computing device may set-up a write-set for a processing unit that may at least avoid unnecessary data transfers. For example, an application executing on the multi-processor computing device may be associated with only a single kernel executing on a GPU. The kernel may be configured to update a few data objects or values within a large buffer associated with the application. Thus, the GPU, via the kernel, may invoke SDWO buffer accesses in which a runtime functionality may configure a write-set on the GPU that does not require a buffer transfer or copy. Once the kernel executing on the GPU identifies buffer index(es) and data to be written to the buffer, the multi-processor computing device may use a CPU coordinator processor to update a valid backing store of the buffer within a memory accessible by the CPU without requiring buffer transfers to or from memory accessible by the GPU.

FIG. 1 illustrates a multi-processor computing device 100 configured to support SDWO buffer accesses suitable for use with various embodiments. The multi-processor computing device 100 may include various hardware and software components, such as found in some typical computing devices (e.g., smartphones, laptop computers, etc.). For example, the multi-processor computing device 100 may include at least a plurality of processing units 101*a*-101*c* (e.g., a CPU 101*a*, a GPU 101*b*, and a DSP 101*c*, etc.).

The multi-processor computing device 100 may also include one or more memory units 102 of various types, such as main memory, GPU local memory, custom accelerator local memory-banks, etc. The memory unit(s) 102 may be configured to store various buffer data 106*a*-106*n* associated with one or more applications. For example, the memory unit(s) 102 may store a plurality of data elements (e.g., items in a linked list, subtrees, etc.) for a physics engine, a step simulation program, etc. The buffer data 106*a*-106*n* for the application may be distributed throughout the memory unit(s) 102.

In various embodiments, each processing unit 101*a*-101*c* may be connected to only one memory unit and may be configured to access a respective backing store. Processing units 101*a*-101*c* may utilize various types of backing stores. For example, one type of backing store may be a block in main memory, another backing store may be an OpenCL-managed data block, and another backing store may be spread over multiple small scratchpad memory-banks attached to a custom accelerator using separate memory interfaces. Each backing store may hold the contents of a buffer.

In various embodiments, the multi-processor computing device 100 may support a runtime functionality 110 (e.g., software, routines, service(s), logic, circuitry, etc.) that is configured to manage buffer accesses by the various processing units 101a-101c with regard to the application. The runtime functionality 110 may detect one or more concurrent requests to perform SDWO buffer accesses to the buffer data 106a-106n and otherwise perform functions as described herein with reference to FIGS. 2-3B. For example, in response to determining that one or more of the CPU 101a, GPU 101b, and DSP 101c has requested to concurrently write to the buffer data 106a-106n, the runtime functionality 110 may set-up write-sets for the requesting processing units 101a-101c, and identify when the concurrent writes by the processing units 101a-101c have completed (e.g., the conclusion of a wait period). The runtime functionality 110 may further cause various data from the processing units 101a-101c to be written to a valid backing store of the buffer, such as by designating a coordinator processor to receive the write-set data for updating a respective up-to-date backing store. In some embodiments, the runtime functionality 110 may be executed by a main or applications processor (e.g., the CPU 101a).

In some embodiments, the runtime functionality 110 may utilize a translation look aside buffer (TLB 111) that is used to convert virtual addresses to physical addresses of the memory unit(s) 102. For example, in response to receiving a buffer index from one of the processing units 101a-101c, the runtime functionality 110 may perform a lookup using the TLB 111 to identify the physical address in the memory unit(s) 102 of a first segment of the buffer data 106a. Such physical addresses may be used to write directly to the memory unit(s) 102, such as when the processing unit(s) 101a-101c are not able to access memory through virtual addresses. In some embodiments, the runtime functionality 110 may be configured to provide physical addresses to the processing unit(s) 101a-101c. For example, when the DSP 101c is only capable of accessing memory using physical addresses, the runtime functionality 110 may provide physical addresses to the DSP 101c that may be used to conduct direct accesses 120 of the buffer data 106a-106n within the memory unit(s) 102.

Figure 2:
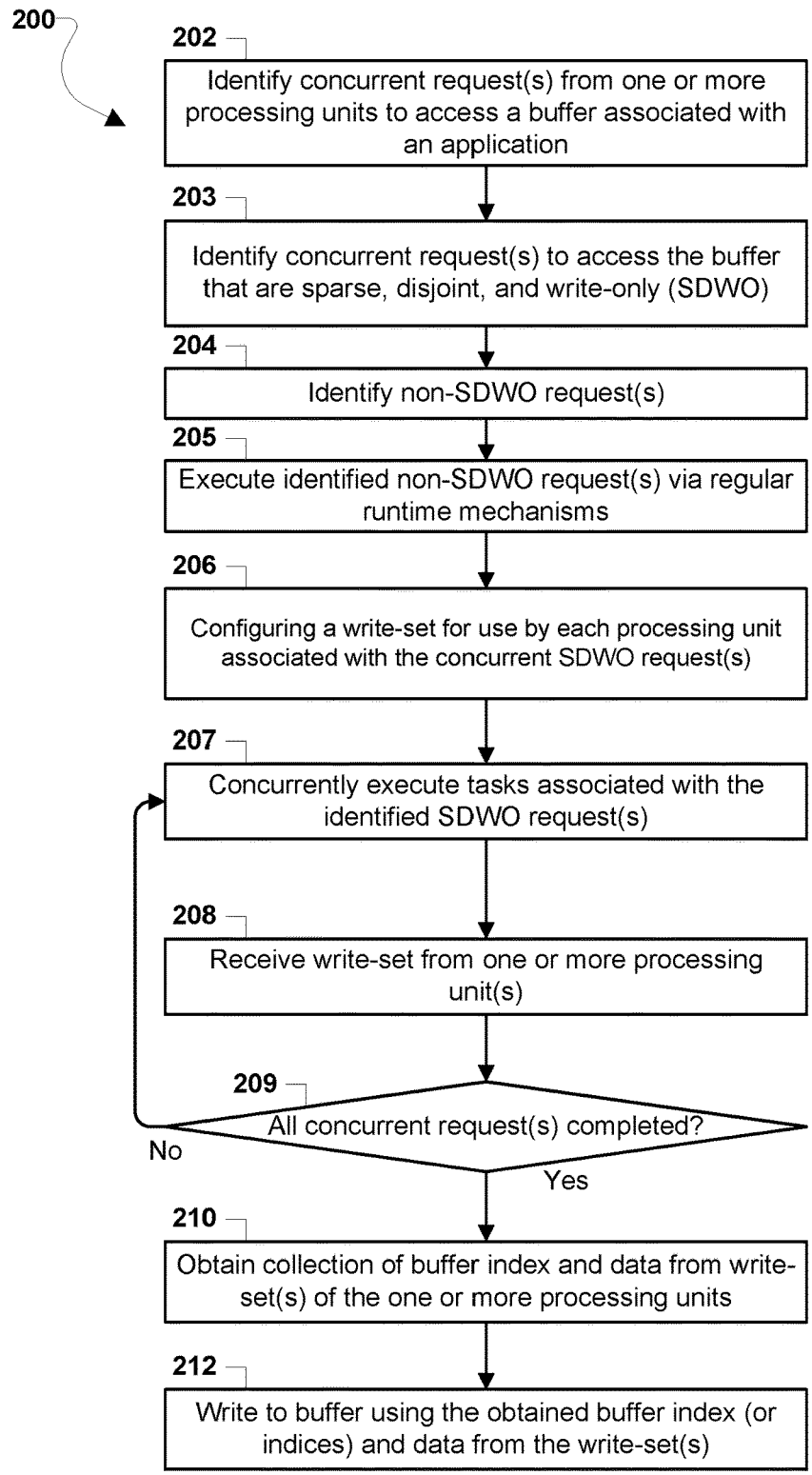
FIG. 2 is a process flow diagram illustrating a method for a multi-processor computing device to synchronize concurrent buffer accesses that are sparse, disjoint, and write-only according to some embodiments.
Figure 3A:
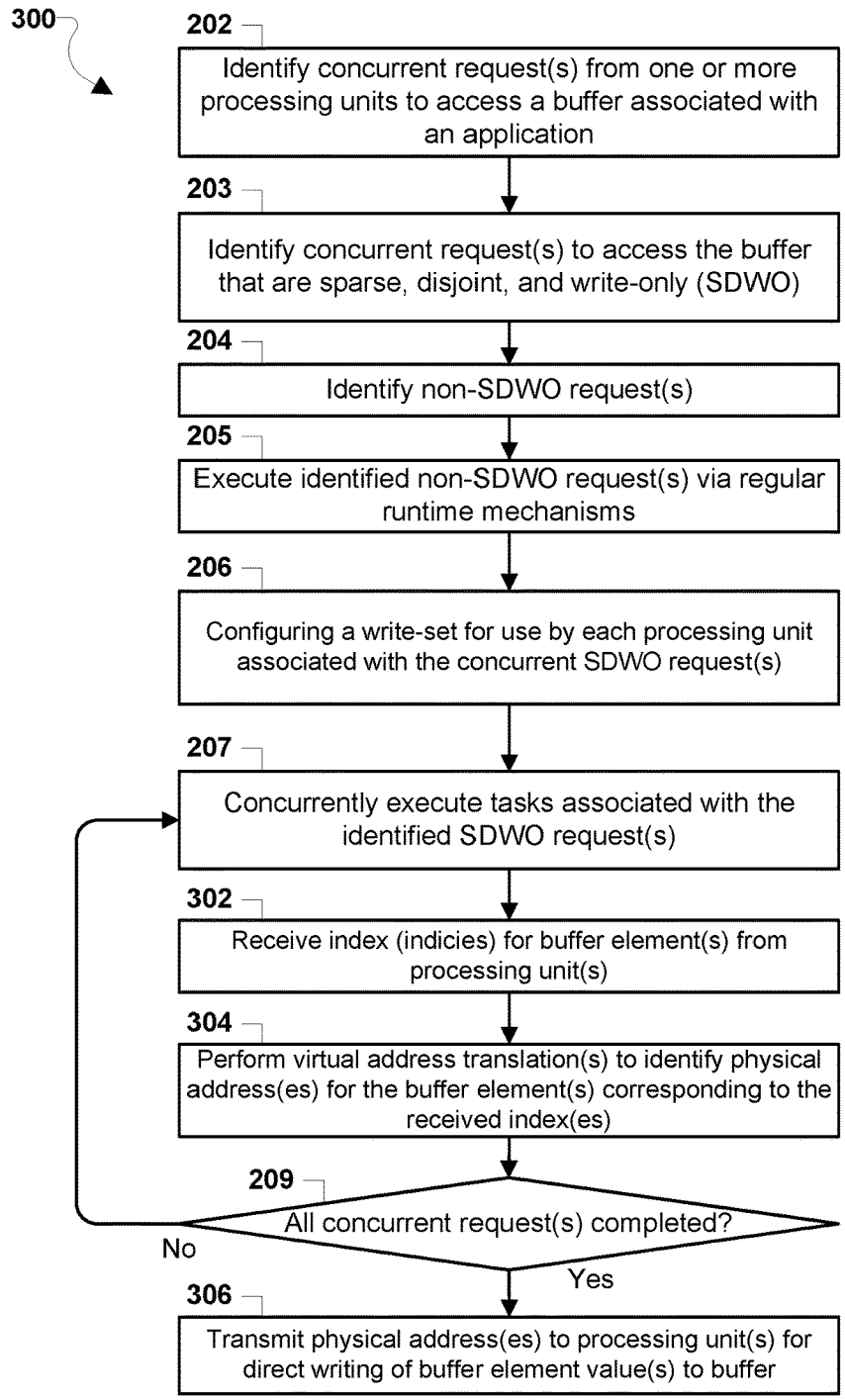
FIGS. 3A-B are process flow diagrams illustrating methods for a multi-processor computing device to synchronize concurrent buffer accesses that are sparse, disjoint, write-only according to some embodiments.
Figure 3B:
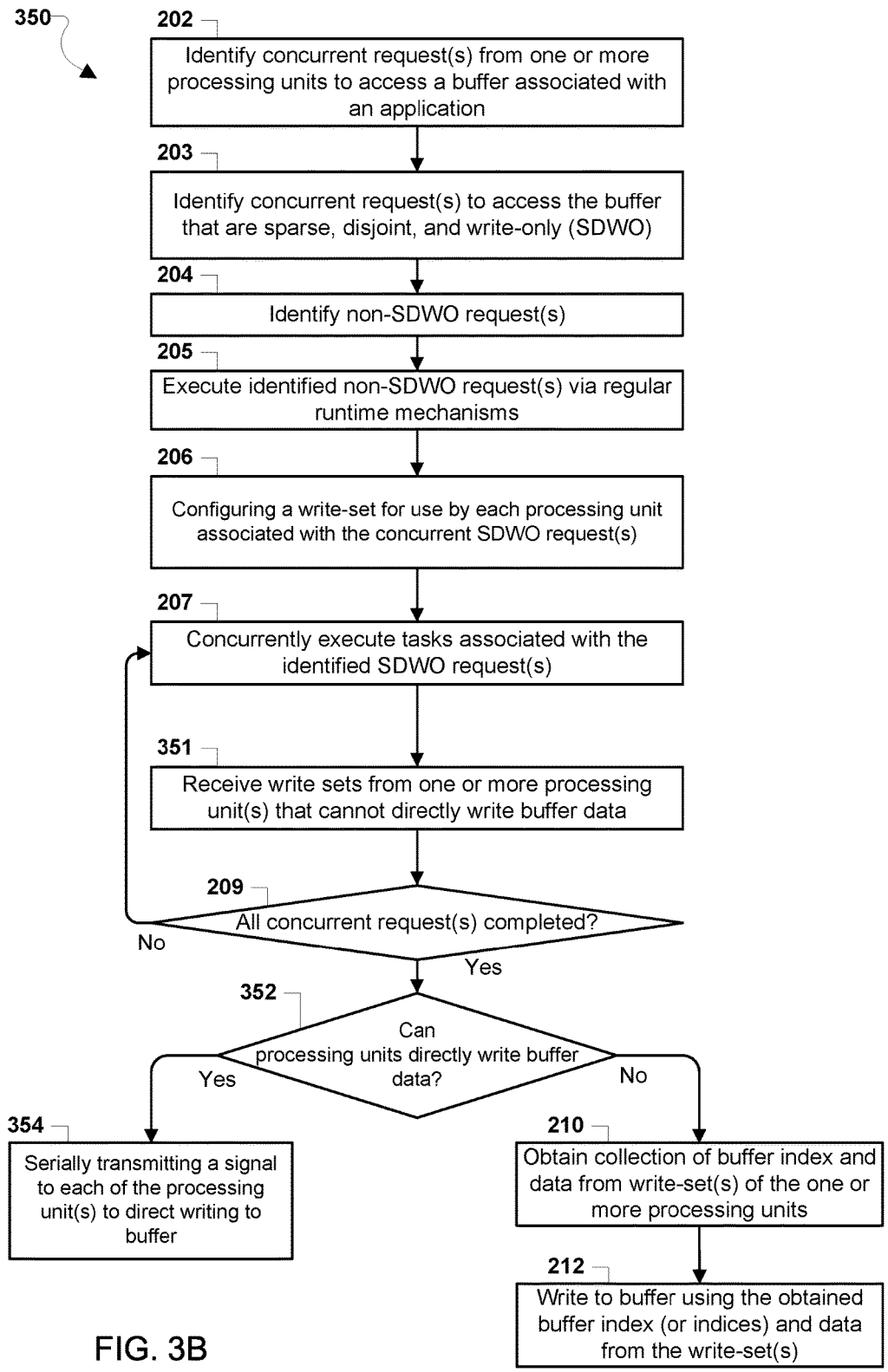

FIGS. 2, 3A-3B illustrate methods 200, 300 and 350, respectively, for a multi-processor computing device to synchronize concurrent buffer accesses that are sparse, disjoint, write-only according to various embodiments. In some embodiments, the multi-processor computing device (e.g., multi-processor computing device 100 in FIG. 1) may execute or otherwise support a runtime functionality (e.g., runtime functionality 110 in FIG. 1) to perform one or more of the operations of the methods. In various embodiments, the operations of the methods 200, 300 and 350 may be performed via one of the processing units of the multi-processor computing device, such as an applications processor or CPU (e.g., CPU 101a in FIG. 1). Further, in some embodiments, various operations from the methods 200, 300, 350 may be performed in various orders or sequences than as depicted in the FIGS. 2, 3A-3B.

FIG. 2 illustrates a method 200 for a multi-processor computing device to synchronize concurrent SDWO buffer accesses to buffer data for an application according to various embodiments. In various embodiments, the application may be a game physics engine, a step simulation program, or other complex application as described herein.

In block 202, the processor of the multi-processor computing device may identify (or detect) concurrent request(s) from one or more processing units to access a buffer associated with an application. The processing units (e.g., a CPU, DSP, GPU, etc.) may each execute software associated with the application (e.g., routines, tasks, kernels, etc.). During the course of execution of the individual tasks, one or more of the processing units may make requests to read and/or write data to the buffer data of the application. For example, the processing units may make API calls to load data objects of a linked list or subtree into local backing stores. The multi-processor computing device may detect any such access requests based on an analysis of task code. For example, the multi-processor computing device, via a runtime functionality, may identify invocations of API calls within the code for various tasks associated with processing units. In various embodiments, each of the plurality of concurrent requests to access the buffer may correspond to an access of a separate data structure that uses the buffer as a memory pool, wherein the data structure may be one of a linked list or a tree. For example, each concurrent request may be made by different processing units accessing separate linked lists or separate sub-trees of a tree, all allocated over the same buffer as memory pool.

In block 203, the processor of the multi-processor computing device may identify any of the identified concurrent request(s) to access the buffer that are sparse, disjoint, and write-only (SDWO). For example, the multi-processor computing device may identify concurrent write requests that correspond to data objects in a linked list or a subtree. In some embodiments, the multi-processor computing device may make the identification based on the type of API call employed by the tasks (or task code) executing on the processing units. For example, the multi-processor computing device may determine whether the concurrent requests correspond to a predefined "special" SDWO API call for SDWO buffer accesses (e.g., a SDWO buffer access request). As another example, the multi-processor computing device may determine whether task code on processing units invoke an "sdwo_write( )" API call. As described, such SDWO API calls may be declared before launch or execution of application code (or task code), such as API calls declared by an application programmer.

In some embodiments, the identification in block 203 may be based on whether the concurrent requests are associated with predefined buffer indices. For example, the multi-processor computing device may configure hardware of the multi-processor computing device to detect write operations to the buffer by the plurality of processing units via typical API calls. In such a case, the multi-processor computing device may convert such write operations to the buffer to write operations to write-sets.

In block 204, the processor of the multi-processor computing device may identify any of the identified concurrent request(s) to access the buffer that are not SDWO (i.e., non-SDWO requests). For example, the multi-processor computing device may determine whether any of the concurrent requests relate to API calls that are not known as SDWO-related.

For the non-SDWO requests, the multi-processor computing device may conduct regular operations to provide buffer access to the associated processing unit(s) and/or task(s). Accordingly, in block 205, the processor of the multi-processor computing device may execute the identified non-SDWO request(s) via regular runtime mechanisms. For example, in response to determining that certain concurrent request(s) to access the buffer are not SDWO, the processor of the multi-processor computing device may serially execute such buffer requests by performing typical operations that may potentially cause or utilize task serialization, cache thrashing, and/or full-buffer copies. Tasks running on processing units that do not utilize SDWO operations may execute as normal, with the usual penalties (e.g., full-buffer-copies, etc.). In some cases, the multi-processor computing device (e.g. via a runtime functionality) may serially transfer the buffer to each of the one or more processing units making the concurrent request(s) to access the buffer. In other words, the multi-processor computing device may perform typical serialization operations to enable the processing units to access the buffer individually in sequence. Such typical operations may create redundant copies and transfers of the buffer data (e.g., transfer to various backing stores of the processing units). Due to the potential differences in the processing units, the transfers of the buffer may be serial in order to ensure coherency.

In response to identifying concurrent request(s) to access the buffer that are SDWO, the processor of the multi-processor computing device may configure (or set-up) a write-set for each of the one or more processing units associated with the identified, concurrent SDWO request(s) in block 206. For example, the multi-processor computing device may configure a per-device write-set on each of the one or more processing units executing tasks that requested SDWO buffer accesses. As described, each write-set may be a set of {index, data value} pairs. Setting-up such write-sets for each of the processing units may result in less system traffic than transferring copies of the buffer to each of the processing units.

The operations in blocks 207-209 may constitute a loop or period during which the multi-processor may be configured to wait a predefined period or otherwise until all concurrent SDWO operations have been addressed by the various processing units with regard to the respective write-sets. In block 207, the multi-processor computing device may concurrently execute tasks associated with the identified SDWO request(s).

In block 208, the processor of the multi-processor computing device may receive a write-set from one or more of the plurality of processing units. For example, the multi-processor computing device may receive a set of buffer index, data value pairs from one or more processing units, wherein each write-set may be a set of buffer index, value pairs. Write-set data may be received as tasks on processing units complete. However, in some iterations of the operational loop of blocks 207-209, no write-set data may be received as processing units may still be performing task operations to generate buffer index and data information for transmission.

In determination block 209, the processor of the multi-processor computing device may determine whether all concurrent SDWO requests have completed. In other words, the multi-processor computing device may wait until write-set data is received from all processing units associated with the identified concurrent SDWO request(s) and/or until a period for executing the tasks associated with the identified SDWO requests has elapsed or otherwise finished. For example, the multi-processor computing device may wait until all of the plurality of processing units have completed performing respective tasks for writing to associated write-sets. As another example, the multi-processor computing device may determine the period is complete in response to identifying a marker within code of the application indicating completion of requested buffer accesses by the plurality of processing units.

In some embodiments, the multi-processor computing device may determine that all concurrent SDWO requests have completed (or that the period has elapsed) in response to detecting that each of the plurality of processing units associated with the identified SDWO requests has made a specialized API call associated with the SDWO operation (e.g., sdwo_wait( )). Such an API call by an individual processing unit may not indicate that the period has ended for all other processing units associated with other identified SDWO requests. Instead, an API call such as "sdwo_wait (b)" may indicate that the multi-processor computing device has access to updated write-set data after a program point corresponding to the invocation of "SDWO_wait(b)". In some embodiments, the multi-processor computing device may wait until the period has elapsed, and the various write-sets have respective updated results.

In some embodiments, there may be alternative ways for the multi-processor computing device to utilize data from write-sets of corresponding processing units. For example, the multi-processor computing device may wait for all tasks accessing write-sets to complete with respective operations (e.g., hold unit wait_for(t1), wait_for(t2), etc., is called by tasks t1-t2, etc.). As another example, the multi-processor computing device may wait directly on the buffer, blocking until all tasks accessing write-sets that were launched prior to a sdwo_wait(b) call have completed. In some embodiments, the multi-processor computing device may determine that the period has completed in response to identifying a marker within code of the application that indicates the completion of requested buffer accesses by the plurality of processing units (i.e., a programmer-defined end to a concurrent write period).

In response to determining that all the concurrent SDWO request(s) have not completed (i.e., determination block 209="No"), the multi-processor computing device may continue executing the tasks in block 207. In some cases, the multi-processor computing device may receive buffer index and data from write-sets of various processing units during subsequent operations of block 208. In other words, the various executing tasks of the processing units may intermittently send respective write-sets with data to be written to the buffer.

In response to determining that all the concurrent SDWO requests have completed (i.e., determination block 209="Yes"), the processor of the multi-processor computing device may obtain a collection of buffer index and data from the write-set(s) of one or more of the plurality of processing units in block 210. In other words, the multi-processor computing device may obtain and merge all write-set data received in response to setting up the various write-sets. For example, the multi-processor computing device may obtain one or a plurality of pairs of data from each of the processing unit(s) that indicates data for updating the buffer (e.g., a collection of (index, element-value) pairs). As described above, the write-sets from each of the processing units associated with SDWO requests (and data therein) may become available to the multi-processor computing device at various times, such as intermittently during the operations of blocks 207-209.

In block 212, the processor of the multi-processor computing device may write to the buffer using the obtained buffer index(es) and data from the write-set(s) of the one or more processing units. For example, the multi-processor computing device may write data to a backing store including the latest version of the buffer data (e.g., write directly to memory locations associated with the buffer of the application).

In some embodiments, the operations of blocks 210-212 may be performed via a coordinator processor. Accordingly, in some embodiments, the multi-processor computing device may perform operations to identify a coordinator processor. As described, such a central processor may be a device or other functionality that has a backing store that is storing valid data for the buffer at the time of the concurrent write request(s). For example, such a coordinator processor may be identified as a CPU that corresponds to a backing store with a valid representation of the buffer data. In such instances, the multi-processor computing device may transmit any information regarding the write-sets to the coordinator processor for writing to the backing store in response to determining that the synchronization period is complete. In response, the coordinator processor may use the write-set information to write to the backing store. For example, a designated CPU coordinator processor may receive the write-sets (e.g., collections of (index, element-value) pairs) from each processing unit when associated tasks complete and then the coordinator processor may update a corresponding backing store with the data from the received write-sets, designating the backing store as storing the most up-to-date data.

FIGS. 3A-3B illustrate embodiment methods 300, 350 for enabling processing units to directly address buffer data when possible. For example, when the buffer consists of large elements (e.g., each buffer element is a large "struct" data object), the multi-processor computing device may incur significant costs (e.g., increases in power demand and/or increases in processing overhead) when copying the written data elements as part of transmitting the write sets to a designated processing unit (208) that will update the buffer with the write sets (210, 212). Therefore, the multi-processor computing device may leverage any capabilities of the processing units to directly access memory units directly (e.g., SVM capabilities) in order to avoid unnecessary buffer copying. The goal is to avoid the double transmission of large data elements over the system bus (i.e., first when the write sets are received, and second when write set data is written to the buffer) while preserving the benefits of SDWO. Instead, various embodiments allow the received write sets to carry alternative information that does not include the written buffer element data.

FIG. 3A illustrates a method 300 for a multi-processor computing device to synchronize concurrent SDWO buffer accesses to buffer data for an application according to various embodiments. The method 300 is similar to the method 200 described with reference to FIG. 2, except that the method 300 includes operations for performing virtual address look-ups for processing units that may be limited to operate on physical addresses. When a concurrent processing unit completes execution, only the buffer indices of the buffer elements written are received from the processing unit (302), without the buffer element data as was the case in 208. The multi-processor computing device may look up the virtual address of a received buffer index in a backing store holding the latest contents of the buffer, translate the virtual address to a physical address, and transmit the physical address back to processing unit. The processing unit may use the physical address to write the corresponding buffer element directly to the backing store, thereby avoiding the double transmission of a large buffer element. In another embodiment, in order to improve on the efficiency of writing to the buffer of the application, the multi-processor computing device may utilize any coherency capabilities of the various processing units to enable direct writing to the buffer data. For example, as shown in FIG. 3B, some processing units may have SVM capabilities, while other processing units may not. Therefore, the multi-processor computing device may automatically determine that regular mechanisms should be used for accessing the buffer directly for devices with SVM capabilities, but determine that non-SVM processing units should use write-sets to perform SDWO buffer accesses for an application. In this manner, writing to the buffer may be done by some of the processing units themselves, in contrast to the writing being accomplished exclusively by a coordinator processor as described herein.

Referring to FIG. 3A, the operations of blocks 202-207, 209 may be similar to the operations of like numbered blocks of the method 200 described with reference to FIG. 2. In block 302, the processor of the multi-processor computing device may receive index(es) for buffer elements of the buffer from the processing unit(s). In block 304, the processor of the multi-processor computing device may perform a virtual address translation to identify physical address(es) for the buffer elements corresponding to the received index(es).

After determining that all concurrent SDWO request(s) have completed (or a period for executing the concurrent SDWO requests ends) (i.e., determination block 209="Yes"), the processor of the multi-processor computing device may transmit the physical address(es) to the processing unit(s) for direct writing to the buffer (e.g., direct writing of the buffer element value to the buffer) in block 306. Such physical address(es) may then be employed by processing unit(s) to perform SDWO buffer access(es) without requiring the double transmission of possibly large buffer elements.

FIG. 3B illustrates a method 350 for a multi-processor computing device to synchronize concurrent SDWO buffer accesses to buffer data for an application according to various embodiments. The method 350 is similar to the method 200 described with reference to FIG. 2, except that the method 350 includes operations for enabling direct writing to a buffer by processing units configured with the appropriate functionalities (e.g., SVM functionality). The multi-processor computing device (e.g., via a coordinator processor as described herein) may serially indicate to the processing units associated with concurrent SDWO requests when these processing units can directly write respective write-sets to a single backing store with up-to-date buffer data. For example, the multi-processor computing device (e.g., via a coordinator processor) may monitor for reception of a message from a processing unit that indicates when the processing unit has completed execution of a SDWO buffer access. That processing unit may wait to receive a response from the multi-processor computing device (e.g., via the coordinator processor) indicating that the processing unit may directly update a backing store with a respective write-set. In response to receiving such a signal (e.g., from the coordinator processor), the processing unit may perform driver-managed flushes, explicit cache flushes, and/or configure a translation look-aside buffer (TLB) to consistently update the backing store. In this way, write-sets for some processing units may not be transmitted (e.g., to a coordinator processor) and some processing units may write directly to memory when all of the concurrent processing units complete execution.

Referring to FIG. 3B, the operations of blocks 202-207 may be similar to the operations of like numbered blocks of the method 200 described with reference to FIG. 2. In block 351, the processor of the multi-processor computing device may receive write sets from one or more processing units that cannot directly write buffer data.

Once all concurrent requests are completed (i.e., determination block 209="Yes"), the processor of the multi-processor computing device may determine whether any of the processing units that requested the concurrent SDWO buffer accesses (or writes) are capable of directly writing buffer data (or addressing the buffer directly) in determination block 352. For example, the multi-processor computing device may determine whether the processing units can address virtual addresses directly but may lack full SVM cache coherence. Any such processing units may be directed to perform write-backs directly to memory in order to save redundant copying of the buffer.

In response to determining that processing unit(s) that requested concurrent SDWO writes are not capable of addressing the buffer directly (i.e., determination block 352="No"), the multi-processor computing device may perform the operations of blocks 210-212 as described with reference to FIG. 2 with regard to the write-sets of those processing unit(s).

In response to determining that processing unit(s) that requested concurrent writes are capable of addressing the buffer directly (i.e., determination block 352="Yes"), the processor of the multi-processor computing device may serially transmit a signal to each of those processing unit(s) for direct writing to the buffer in block 354. In other words, these processing unit(s) may be configured to concurrently execute (in the process constructing their respective write sets), and upon completion of execution wait for a signal to serially write their write sets directly to the buffer (e.g., a backing store with up-to-date data of the buffer). The signal may cause each of these processing unit(s) to write respective write-set data to a single backing store (e.g., a backing store of the buffer data associated with a designated coordinator processor). For example, a coordinator processor (e.g., CPU having a valid backing store of the buffer) may signal the processing units to serialize the device writebacks, punctuated by appropriate driver flushes.

In some embodiments, the multi-processor computing device may perform operations of the method 350 to handle concurrent SDWO requests by processing unit(s) eligible to write directly to a buffer (or backing store) and/or processing unit(s) capable of providing write-set data to a coordinator processor for direct writing to the backing store.

The embodiment operations described with reference to FIGS. 3A-3B provide operations that may help the multi-processor computing device avoid "double copying" of updated data entries (e.g., avoid both a first copy to a coordinator processor and then a second copy to a backing store by the coordinator processor). With the methods 300 and 350, the multi-processor computing device may instead enable processing units to write data directly to a buffer. Such embodiment methods may be useful for situations in which individual buffer entries are very large.

In some cases, cache-coherence may not be necessary to ensure consistency. Accordingly, disabling cache-coherence functionalities/policies may save considerable power when not necessary for consistency.

FIG. 4 illustrates a non-limiting example of pseudocode 400 that may be executed by a processor of a multi-processor computing device to enable concurrent buffer accesses that are sparse, disjoint, and write-only according to some embodiments. For example, the pseudocode 400 may be performed by a runtime functionality to manage one or more tasks or other executable elements configured to cause SDWO buffer accesses corresponding to a particular application's buffer.

The pseudocode 400 may include a first section 402 that creates a buffer for the application (e.g., a buffer 'b' that includes 100000 data objects or entries for a game physics engine, etc.).

The pseudocode 400 may include a second section 404 for launching tasks, kernels, and/or other operations to be performed by various processing units of the multi-processor computing device (e.g., CPU, GPU, DSP, custom hardware accelerator, etc.). In launching each task, the multi-processor computing device may provide copies of data for reading and/or writing (e.g., buffers 'a', 'c', 'd', 'e', etc.) and configure write-sets associated with the sdwo buffer V. In other words, the multi-processor computing device may provide some copies of data to the processing units, but may only configure write-sets associated with the sdwo buffer.

The pseudocode 400 may include a third section 406 that causes the multi-processor computing device to wait until each of the processing units has provided at least a buffer index and data based on executions of respective code (e.g., tasks). For example, the multi-processor computing device may wait until the CPU has returned a buffer index and data after executing a "cpu_function" task, the GPU has returned a buffer index and data after executing a "gpu_kernel" kernel, the DSP has returned a buffer index and data after executing a "dsp_kernel" kernel, and a custom hardware accelerator has returned a buffer index and data after executing a "custom_hw_acc1" task.

When all tasks complete, the multi-processor computing device may have received (e.g., intermittently, etc.) all associated write-sets from the various processing units (and respective tasks) and may then update a backing store to update the buffer. In some embodiments, the operations in the third section 406 may include providing received write-set data to a coordinator processor device as well as operations to update a backing store (i.e., updating a common memory for the buffer).

FIGS. 5A-5B illustrate non-limiting examples of pseudocode 500, 550 that may be performed by processing units of a multi-processor computing device according to some embodiments. The pseudocode 500, 550 may be called by at least a CPU, DSP, or GPU in response to the multi-processor computing device performing the operations of the sections 402-404 of the pseudocode 400 illustrated in FIG. 4. In some embodiments, the pseudocode 500, 550 may be implemented for various runtime systems, such as OpenCL.

In FIG. 5A, the pseudocode 500 may include a function ('f') to be performed by a processing unit (e.g., GPU, etc.). The function may utilize input parameters of a normal buffer 'c' and a write-set for the SDWO buffer 'b' (e.g., a pointer to a write-set). While performing the function, the processing unit may eventually make a special API call using the write-set (e.g., sdwo_write( . . . )). Such an API call may include providing parameters that define the write-set (e.g., b_sdwo), the index of the buffer to write to (e.g., 'i'), and data to write to that buffer index (e.g., value). In other words, sdwo_write( ) may be an API call used from within tasks to write a buffer element.

The pseudocode 550 in FIG. 5B resembles a typical function that may be performed by a processing unit. For example, the pseudocode 550 may not include any special API call to invoke or otherwise access a write-set as described herein. However, when the multi-processor computing device is modified to include specialized hardware that is capable of identifying requests for SDWO buffer accesses by processing units, the pseudocode 550 may be used to invoke SDWO optimization according to various embodiments.

Figure 6:
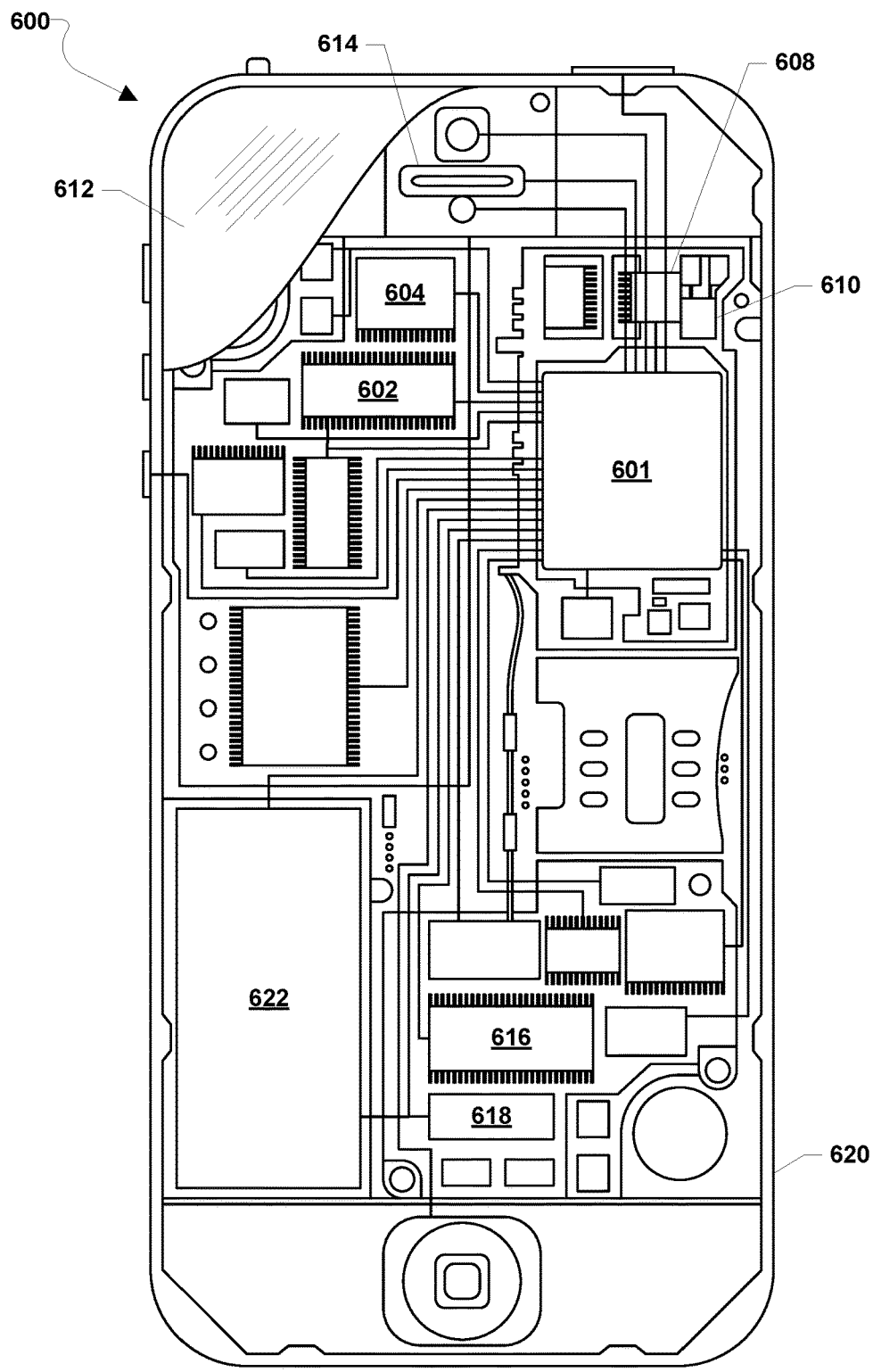
FIG. 6 is a component block diagram of a computing device suitable for use in some embodiments.

Various forms of computing devices, including personal computers and laptop computers, may be used to implement the various embodiments. An example of a multi-processor computing device 600 suitable for implementing the various embodiments is illustrated in FIG. 6. In various embodiments, the multi-processor computing device 600 may include a processor 601 coupled to a touch screen controller 604 and an internal memory 602. The processor 601 may be one or more multicore ICs designated for general or specific processing tasks. The internal memory 602 may be volatile and/or non-volatile memory, and may also be secure and/or encrypted memory, or unsecure and/or unencrypted memory, or any combination thereof. The touch screen controller 604 and the processor 601 may also be coupled to a touch screen panel 612, such as a resistive-sensing touch screen, capacitive-sensing touch screen, infrared sensing touch screen, etc. The multi-processor computing device 600 may have one or more radio signal transceivers 608 (e.g., Bluetooth®, ZigBee®, Wi-Fi®, radio frequency (RF) radio) and antennae 610, for sending and receiving, coupled to each other and/or to the processor 601. The transceivers 608 and antennae 610 may be used with the above-mentioned circuitry to implement the various wireless transmission protocol stacks and interfaces. The multi-processor computing device 600 may include a cellular network wireless modem chip 616 that enables communication via a cellular network and is coupled to the processor. The multi-processor computing device 600 may include a peripheral device connection interface 618 coupled to the processor 601. The peripheral device connection interface 618 may be singularly configured to accept one type of connection, or multiply configured to accept various types of physical and communication connections, common or proprietary, such as USB, FireWire, Thunderbolt, or PCIe. The peripheral device connection interface 618 may also be coupled to a similarly configured peripheral device connection port (not shown). The multi-processor computing device 600 may also include speakers 614 for providing audio outputs. The multi-processor computing device 600 may also include a housing 620, constructed of a plastic, metal, or a combination of materials, for containing all or some of the components discussed herein. The multi-processor computing device 600 may include a power source 622 coupled to the processor 601, such as a disposable or rechargeable battery. The rechargeable battery may also be coupled to the peripheral device connection port to receive a charging current from a source external to the multi-processor computing device 600.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The various processors described herein may be any programmable microprocessor, microcomputer or multiple processor chip or chips that can be configured by software instructions (applications) to perform a variety of functions, including the functions of the various embodiments described herein. In the various devices, multiple processors may be provided, such as one processor dedicated to wireless communication functions and one processor dedicated to running other applications. Typically, software applications may be stored in internal memory before being accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of respective functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The operations of a method or algorithm disclosed herein may be embodied in a processor-executable software module or processor-executable software instructions, which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray Disc® where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the embodiment methods of the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method for a multi-processor computing device to merge concurrent writes from a plurality of processing units to a buffer associated with an application, comprising:
    identifying, by a processor of the multi-processor computing device, a plurality of concurrent requests to access the buffer that are sparse, disjoint, and write-only (SDWO), wherein each concurrent request updates data stored in the buffer and referenced by a buffer index;
    configuring, by the processor, a write-set for each of the plurality of processing units, wherein each write-set comprises one or more pair of a buffer index and data, each pair corresponding to one of the plurality of concurrent requests;
    executing, by the plurality of processing units, the plurality of concurrent requests to access the buffer using the write-sets;
    determining, by the processor, whether each of the plurality of concurrent requests to access the buffer is complete;
    obtaining, by the processor, a buffer index and data via the write-set of each of the plurality of processing units; and
    writing, by the processor, to the buffer using the obtained buffer index and data via the write-set of each of the plurality of processing units in response to determining that each of the plurality of concurrent requests to access the buffer is complete.

2. The method of claim 1, wherein identifying, by the processor of the multi-processor computing device, the plurality of concurrent requests to access the buffer that are sparse, disjoint, and write-only (SDWO) comprises:
    identifying, by the processor, an SDWO application programming interface (API) call of a task executing on each of the plurality of processing units.

3. The method of claim 1, further comprising:
    receiving, by the processor, an index for a buffer element from one of the plurality of processing units; and
    performing, by the processor, a virtual address translation to identify a physical address for the buffer element corresponding to the received index,
    the method further comprising transmitting, by the processor, the physical address to the one of the plurality of processing units for direct writing of a buffer element value to the buffer in response to performing the virtual address translation.

4. The method of claim 1, wherein determining, by the processor, whether each of the plurality of concurrent requests to access the buffer is complete comprises:
    waiting, by the processor, until all of the plurality of processing units have completed performing respective tasks for writing to associated write-sets.

5. The method of claim 1, wherein determining, by the processor, whether each of the plurality of concurrent requests to access the buffer is complete comprises:
    identifying, by the processor, a marker within code of the application indicating completion of requested buffer accesses by the plurality of processing units.

6. The method of claim 1, further comprising:
    determining, by the processor, whether the plurality of processing units are configured to directly write to the buffer; and
    serially transmitting, by the processor, a signal to each of the plurality of processing units in response to determining that the plurality of processing units are configured to directly write to the buffer, wherein the signal indicates when each of the plurality of processing units can directly write to the buffer.

7. The method of claim 1, further comprising:
    identifying, by the processor, another plurality of concurrent requests to access the buffer that are not sparse, disjoint, and write-only; and
    serially transferring, by the processor, the buffer to each processing unit associated with the another plurality of concurrent requests such that the another plurality of concurrent requests are executed serially.

8. The method of claim 1, further comprising:
    identifying, by the processor, a coordinator processor as having a backing store with valid data for the buffer; and
    transmitting, via the processor, data of the write-sets to the coordinator processor for writing to the backing store in response to determining that each of the plurality of concurrent requests to access the buffer is complete.

9. The method of claim 8, wherein writing, by the processor, to the buffer using the obtained buffer index and data via the write-set of each of the plurality of processing units in response to determining that each of the plurality of concurrent requests to access the buffer is complete comprises:
    writing, by the coordinator processor, to the backing store associated with the coordinator processor.

10. The method of claim 1, wherein each of the plurality of concurrent requests to access the buffer corresponds to an access of a separate data structure that uses the buffer as a memory pool, wherein the data structure is one of a linked list or a tree.

11. The method of claim 1, wherein the application is a step simulation program.

12. The method of claim 1, wherein the processor is executing a runtime system.

13. The method of claim 1, wherein identifying, by the processor of the multi-processor computing device, the plurality of concurrent requests to access the buffer that are sparse, disjoint, and write-only (SDWO) comprises:
determining, by the processor, that the plurality of concurrent requests are requests to write the same value to the same buffer index.

14. A computing device, comprising:
a memory; and
a plurality of processing units including a processor coupled to the memory and configured with processor-executable instructions to perform operations comprising:
identifying a plurality of concurrent requests to access a buffer that are sparse, disjoint, and write-only (SDWO), wherein the buffer is associated with an application and each concurrent request updates data stored in the buffer and referenced by a buffer index;
configuring a write-set for each of the plurality of processing units, wherein each write-set comprises one or more pair of a buffer index and data, each pair corresponding to one of the plurality of concurrent requests;
executing the plurality of concurrent requests to access the buffer using the write-sets;
determining whether each of the plurality of concurrent requests to access the buffer is complete;
obtaining a buffer index and data via the write-set of each of the plurality of processing units; and
writing to the buffer using the obtained buffer index and data via the write-set of each of the plurality of processing units in response to determining that each of the plurality of concurrent requests to access the buffer is complete.

15. The computing device of claim 14, wherein the processor is configured with processor-executable instructions to perform operations such that identifying the plurality of concurrent requests to access the buffer that are sparse, disjoint, and write-only (SDWO) comprises:
identifying an SDWO application programming interface (API) call of a task executing on each of the plurality of processing units.

16. The computing device of claim 14, wherein the processor is configured with processor-executable instructions to perform operations further comprising:
receiving an index for a buffer element from one of the plurality of processing units;
performing a virtual address translation to identify a physical address for the buffer element corresponding to the received index; and
transmitting the physical address to the one of the plurality of processing units for direct writing of a buffer element value to the buffer in response to performing the virtual address translation.

17. The computing device of claim 14, wherein the processor is configured with processor-executable instructions to perform operations such that determining whether each of the plurality of concurrent requests to access the buffer is complete comprises:
waiting until all of the plurality of processing units have completed performing respective tasks for writing to associated write-sets.

18. The computing device of claim 14, wherein the processor is configured with processor-executable instructions to perform operations such that determining whether each of the plurality of concurrent requests to access the buffer is complete comprises:
identifying a marker within code of the application indicating completion of requested buffer accesses by the plurality of processing units.

19. The computing device of claim 14, wherein the processor is configured with processor-executable instructions to perform operations further comprising:
determining whether the plurality of processing units are configured to directly write to the buffer; and
serially transmitting a signal to each of the plurality of processing units in response to determining that the plurality of processing units are configured to directly write to the buffer, wherein the signal indicates when each of the plurality of processing units can directly write to the buffer.

20. The computing device of claim 14, wherein the processor is configured with processor-executable instructions to perform operations further comprising:
identifying another plurality of concurrent requests to access the buffer that are not sparse, disjoint, and write-only; and
serially transferring the buffer to each processing unit associated with the another plurality of concurrent requests such that the another plurality of concurrent requests are executed serially.

21. The computing device of claim 14, wherein the processor is configured with processor-executable instructions to perform operations further comprising:
identifying a coordinator processor as having a backing store with valid data for the buffer; and
transmitting data of the write-sets to the coordinator processor for writing to the backing store in response to determining that each of the plurality of concurrent requests to access the buffer is complete.

22. The computing device of claim 21, wherein the processor is configured with processor-executable instructions to perform operations such that writing to the buffer using the obtained buffer index and data via the write-set of each of the plurality of processing units in response to determining that each of the plurality of concurrent requests to access the buffer is complete comprises:
writing to the backing store associated with the coordinator processor.

23. The computing device of claim 14, wherein each of the plurality of concurrent requests to access the buffer corresponds to an access of a separate data structure that uses the buffer as a memory pool, wherein the data structure is one of a linked list or a tree.

24. The computing device of claim 14, wherein the application is a step simulation program.

25. The computing device of claim 14, wherein the processor is executing a runtime system.

26. The computing device of claim 14, wherein the processor is configured with processor-executable instructions to perform operations such that identifying the plurality of concurrent requests to access the buffer that are sparse, disjoint, and write-only (SDWO) comprises:
determining that the plurality of concurrent requests are requests to write the same value to the same buffer index.

27. A non-transitory processor-readable storage medium having stored thereon processor-executable instructions configured to cause a processor of a computing device to perform operations comprising:
identifying a plurality of concurrent requests to access a buffer that are sparse, disjoint, and write-only (SDWO), wherein the buffer is associated with an application and each concurrent request updates data stored in the buffer and referenced by a buffer index;

configuring a write-set for each of a plurality of processing units within the computing device, wherein each write-set comprises one or more pair of a buffer index and data, each pair corresponding to one of the plurality of concurrent requests;

executing the plurality of concurrent requests to access the buffer using the write-sets;

determining whether each of the plurality of concurrent requests to access the buffer is complete;

obtaining a buffer index and data via the write-set of each of the plurality of processing units; and writing to the buffer using the obtained buffer index and data via the write-set of each of the plurality of processing units in response to determining that each of the plurality of concurrent requests to access the buffer is complete.

28. The non-transitory processor-readable storage medium of claim 27, wherein the stored processor-executable instructions are configured to cause the processor of the computing device to perform operations such that identifying the plurality of concurrent requests to access the buffer that are sparse, disjoint, and write-only (SDWO) comprises:

identifying an SDWO application programming interface (API) call of a task executing on each of the plurality of processing units.

29. The non-transitory processor-readable storage medium of claim 27, wherein the stored processor-executable instructions are configured to cause the processor of the computing device to perform operations further comprising:

receiving an index for a buffer element from one of the plurality of processing units;

performing a virtual address translation to identify a physical address for the buffer element corresponding to the received index; and transmitting the physical address to the one of the plurality of processing units for direct writing of a buffer element value to the buffer in response to performing the virtual address translation.

30. A computing device, comprising:

means for identifying a plurality of concurrent requests to access a buffer that are sparse, disjoint, and write-only (SDWO), wherein the buffer is associated with an application and each concurrent request updates data stored in the buffer and referenced by a buffer index;

means for configuring a write-set for each of a plurality of processing units within the computing device, wherein each write-set comprises one or more pair of a buffer index and data, each pair corresponding to one of the plurality of concurrent requests;

means for executing the plurality of concurrent requests to access the buffer using the write-sets;

means for determining whether each of the plurality of concurrent requests to access the buffer is complete;

means for obtaining a buffer index and data via the write-set of each of the plurality of processing units; and means for writing to the buffer using the obtained buffer index and data via the write-set of each of the plurality of processing units in response to determining that each of the plurality of concurrent requests to access the buffer is complete.

\* \* \* \* \*